(12) United States Patent
Baumberg et al.

(10) Patent No.: US 10,715,787 B1
(45) Date of Patent: Jul. 14, 2020

(54) DEPTH IMAGING SYSTEM AND METHOD FOR CONTROLLING DEPTH IMAGING SYSTEM THEREOF

(71) Applicant: ULSee Inc., Taipei (TW)

(72) Inventors: Adam Baumberg, Guildford (GB); Mark Middlebrook, Guildford (GB)

(73) Assignee: ULSee Inc., Taipei (TW)

( * ) Notice: Subject to any disclaimer, the term of this patent is extended or adjusted under 35 U.S.C. 154(b) by 0 days.

(21) Appl. No.: 16/515,106

(22) Filed: Jul. 18, 2019

Related U.S. Application Data

(60) Provisional application No. 62/822,079, filed on Mar. 22, 2019.

(51) Int. Cl.
*H04N 7/18* (2006.01)
*H04N 13/204* (2018.01)
*H04N 5/232* (2006.01)
*H04N 5/247* (2006.01)
*H04N 13/00* (2018.01)

(52) U.S. Cl.
CPC ....... *H04N 13/204* (2018.05); *H04N 5/23296* (2013.01); *H04N 5/247* (2013.01); *H04N 2013/0081* (2013.01); *H04N 2213/001* (2013.01)

(58) Field of Classification Search
CPC .. H04N 13/204; H04N 5/247; H04N 5/23296; H04N 2013/0081; H04N 2213/001
USPC .......................................................... 348/42
See application file for complete search history.

(56) References Cited

U.S. PATENT DOCUMENTS

| 2015/0310622 A1* | 10/2015 | Kholodenko | G01S 17/894 382/154 |
| 2016/0163056 A1* | 6/2016 | Ishihara | G06T 7/571 382/106 |
| 2016/0198147 A1* | 7/2016 | Waligorski | G01S 17/36 348/49 |

OTHER PUBLICATIONS

Zia Uddin et al, Facial expression recognition using salient features and convolution neural network (Year: 2017).*

* cited by examiner

*Primary Examiner* — Shan E Elahi
(74) *Attorney, Agent, or Firm* — Alan D. Kamrath; Mayer & Williams PC

(57) ABSTRACT

A depth imaging system and a control method thereof are provided. The depth imaging system includes a first imaging device, a second imaging device, a sliding base, a detecting module, an estimating module, a calculating module, and a control module. The first imaging device and the second imaging device are mounted on the sliding base. The detecting module detects a target region of the first image and the second image. The estimating module estimates an initial depth of the target region. The calculating module calculates a baseline corresponding to the initial depth. The control module controls the sliding base to adjust a relative distance between the first imaging device and the second imaging device. The calculating module generates an adjusted baseline according to the adjusted relative distance between the first imaging device and the second imaging device, such that the adjusted baseline is closer to the calculated baseline.

14 Claims, 3 Drawing Sheets

DEPTH IMAGING SYSTEM AND METHOD FOR CONTROLLING DEPTH IMAGING SYSTEM THEREOF

FIELD OF THE DISCLOSURE

The present invention relates to an imaging visual field, and more particularly to, a depth imaging system having two imaging devices that can move apart or closer and a method for controlling a depth imaging system thereof.

BACKGROUND OF THE INVENTION

In surveillance for facial recognition, 3D information can be used to reliably identify a human face from facial feature data. In addition, 3D depth information can help in monitoring and image understanding.

One known method of capturing 3D depth information is using depth cameras—image features are matched between a pair of views taken a distance apart ("baseline"). Conventionally, a baseline defines a region of reliable 3D space where depth information is reliable. In order to "triangulate" a 3D point, two views of the 3D point are identified, and the 3D point is calculated by back-projecting and intersecting two rays (3D lines) from each camera. However, if the two 3D lines are too close to be almost parallel, the intersection point is poorly defined.

Therefore, in order to obtain the reliable depth information close to the cameras, the baseline between the cameras needs to be small to ensure that: (a) both cameras can see the 3D point, and (b) the angle between the rays is large enough. Similarly, in order to obtain the reliable depth far from the camera, the stereo baseline needs to be much larger.

Hence, how to accurately obtain depth information is an important issue in this field.

It should be noted that the above description of the technical background is merely for the purpose of facilitating a clear and complete description of technical solutions of the present invention, and is convenient for understanding by those skilled in the art. The above technical solutions should not be considered to be well-known to those skilled in the art, simply because these aspects are set forth in background section of the present invention.

SUMMARY OF THE INVENTION

In order to solve the above problems, it is an object of the present invention to provide a depth imaging system and a method for controlling a depth imaging system thereof.

According to an exemplary embodiment, a depth imaging system is provided. The depth imaging system includes a first imaging device, a second imaging device, a sliding base, a detecting module, an estimating module, a calculating module, and a control module. The first imaging device is configured to capture a first image. The second imaging device is configured to capture a second image. The first imaging device and the second imaging device are mounted on the sliding base. The detecting module is configured to detect a target region of the first image and the second image in real time. The estimating module is coupled to the detecting module, and is configured to estimate an initial depth of the target region. The calculating module is coupled to the estimating module, and is configured to calculate a baseline corresponding to the initial depth. The control module is coupled to the calculating module and the sliding base, and is configured to control the sliding base to adjust a relative distance between the first imaging device and the second imaging device. The calculating module is further configured to generate an adjusted baseline according to the adjusted relative distance between the first imaging device and the second imaging device, such that the adjusted baseline is closer to the calculated baseline.

In one embodiment, a first focal length of the first imaging device is automatically adjusted, such that the target region is filled with a first zoomed image; and a second focal length of the second imaging device is automatically adjusted, such that the target region is filled with a second zoomed image.

In one embodiment, the first imaging device and the second imaging device are two cameras.

In one embodiment, the first imaging device is a projector and the second imaging device is an imaging camera.

In one embodiment, the estimating module is further configured to sample a central region of a scene, and calculate an approximate depth of an average value or an intermediate value of the central region.

In one embodiment, the calculating module is further configured to calculate the baseline based on a fixed linear scaling of a depth value of the baseline.

In one embodiment, the baseline is calculated based on the equation: baseline=0.1×depth value.

According to another exemplary embodiment, a method for controlling a depth imaging system is provided. The depth imaging system includes a first imaging device for capturing a first image and a second imaging device for capturing a second image mounted on a sliding base. The method includes the following steps: detecting a target region of the first image and the second image in real time; estimating an initial depth of the target region; calculating a baseline corresponding to the initial depth; controlling the sliding base to adjust a relative distance between the first imaging device and the second imaging device; and generating an adjusted baseline according to the adjusted relative distance between the first imaging device and the second imaging device, such that the adjusted baseline is closer to the calculated baseline.

In one embodiment, the method further includes the following steps: automatically adjusting a first focal length of the first imaging device, such that the target region is filled with a first zoomed image; and automatically adjusting a second focal length of the second imaging device, such that the target region is filled with a second zoomed image.

In one embodiment, the first imaging device and the second imaging device are two cameras.

In one embodiment, the first imaging device is a projector and the second imaging device is an imaging camera.

In one embodiment, the method further includes the following step: sampling a central region of a scene, and calculating an approximate depth of an average value or an intermediate value of the central region.

In one embodiment, the step of calculating the baseline corresponding to the initial depth includes: calculating the baseline based on a fixed linear scaling of a depth value of the baseline.

In one embodiment, the baseline is calculated based on the equation: baseline=0.1×depth value.

With the above technical solution, the beneficial effects of the depth imaging system of the present invention are as follows: an optimal baseline can be adjusted to obtain accurate depth information.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 1:
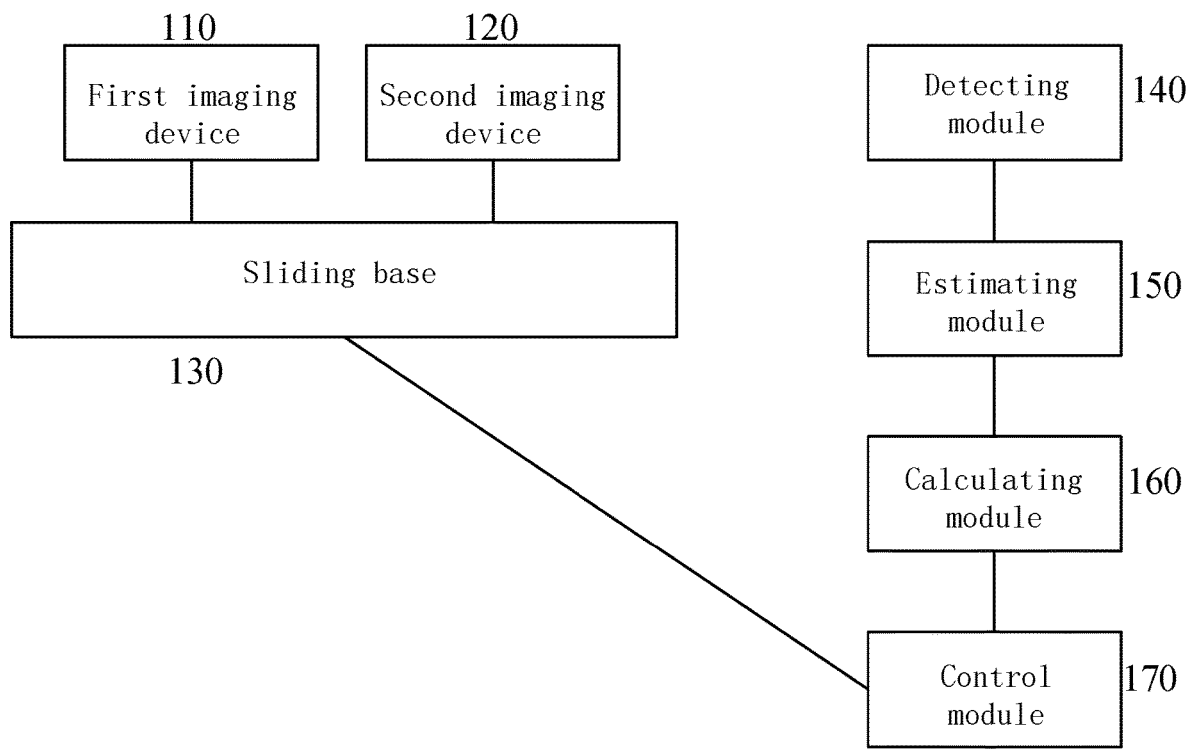
FIG. 1 is a block diagram of a depth imaging system according to an embodiment of the present invention.

The serial numbers in the figures:
100 Depth imaging system
110 First imaging device
120 Second imaging device
130 Sliding base
140 Detecting module
150 Estimating module
160 Calculating module
170 Control module
d1、d2 Relative distance
θ1、θ2 Angle
S310-S350 Step

DESCRIPTION OF THE PREFERRED EMBODIMENTS

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Please refer to FIG. 1. FIG. 1 is a block diagram of a depth imaging system 100 according to an embodiment of the present invention.

The depth imaging system 100 includes a first imaging device 110, a second imaging device 120, a sliding base 130, a detecting module 140, an estimating module 150, a calculating module 160, and a control module 170. The first imaging device 110 is configured to capture a first image. The second imaging device 120 is configured to capture a second image. The first imaging device 110 and the second imaging device 120 are mounted on the sliding base 130. The detecting module 140 is configured to detect a target region of the first image and the second image in real time. The estimating module 150 is coupled to the detecting module 140, and is configured to estimate an initial depth of the target region. The calculating module 160 is coupled to the estimating module 150, and is configured to calculate a baseline corresponding to the initial depth. The control module 170 is coupled to the calculating module 160 and the sliding base 130, and is configured to control the sliding base 130 to adjust a relative distance between the first imaging device 110 and the second imaging device 120. The calculating module 160 is further configured to generate an adjusted baseline according to the adjusted relative distance between the first imaging device 110 and the second imaging device 120 to ensure that the adjusted baseline is closer to the calculated baseline.

For example, the depth imaging system 100 has the first imaging device 110 and the second imaging device 120 disposed on a slidable sliding base 130. In one implementation manner, the first imaging device 110 and the second imaging device 120 may be two cameras, such as two IR cameras. In another implementation manner, the first imaging device 110 may be a projector and the second imaging device 120 may be an imaging camera. The control module 170 is enabled to change the baseline using an electronically-controlled motor (not shown in FIG. 1). However, this is merely an example and should not be a limitation of the present invention.

In one implementation manner, a first focal length of the first imaging device 110 may be automatically adjusted, such that the target region is filled with a first zoomed image; and a second focal length of the second imaging device 120 may be automatically adjusted, such that the target region is filled with a second zoomed image. However, this is merely an example and should not be a limitation of the present invention. In another implementation manner, the first focal length of the first imaging device 110 and the second focal length of the second imaging device 120 can be manually adjusted.

In one implementation manner, the estimating module 150 is further configured to sample a central region of a scene, and calculate an approximate depth of an average value or an intermediate value of the central region. In another implementation manner, the calculating module 160 is further configured to calculate the baseline based on a fixed linear scaling of a depth value of the baseline. For example, the baseline may be calculated based on the equation: baseline=0.1×depth value.

Figure 2:
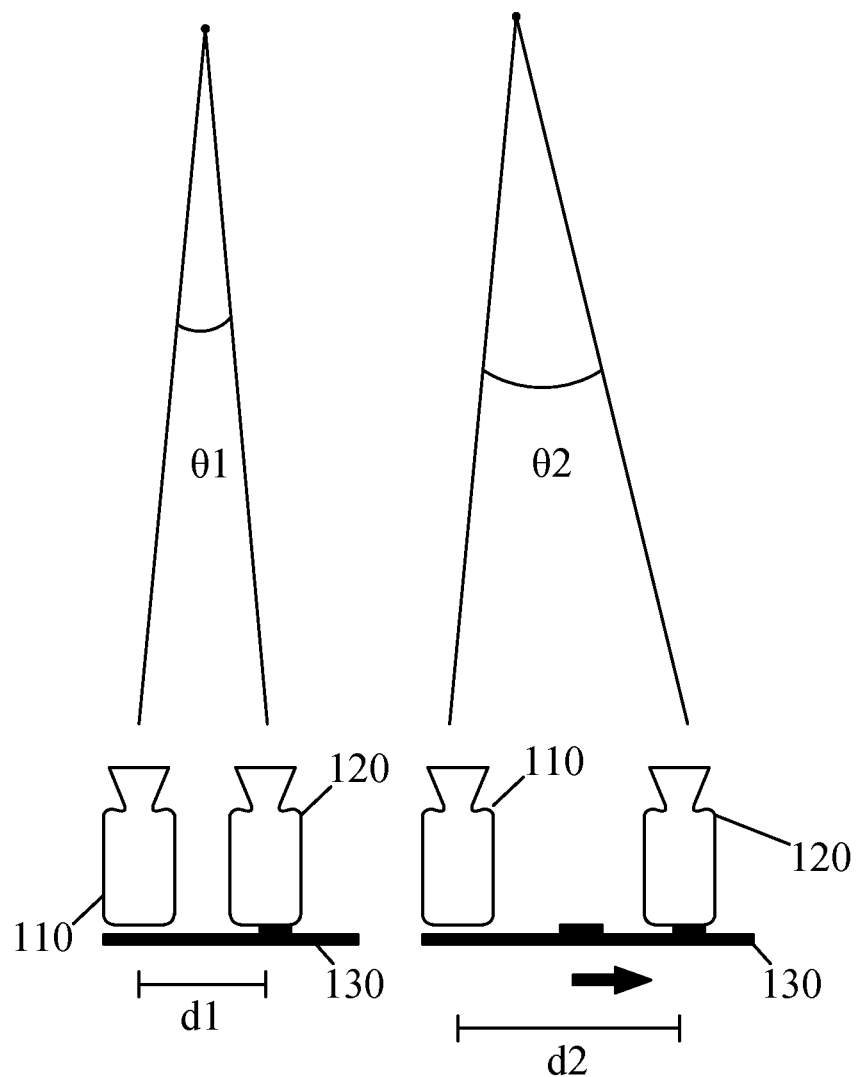
FIG. 2 is a diagram showing operations of a depth imaging system according to an embodiment of the present invention.

Please refer to FIG. 2. FIG. 2 is a diagram showing operations of a depth imaging system 100 according to an embodiment of the present invention. In one embodiment, the sliding base 130 may use electronic control to slide the first imaging device 110 or the second imaging device 120 to change the baseline. In another embodiment, the sliding base 130 may simultaneously slide the first imaging device 110 and the second imaging device to change the baseline. Furthermore, the first imaging device 110 and the second imaging device 120 may be placed on a pan/tilt platform of the electronically-controlled sliding base 130.

Furthermore, the control module 170 can control the sliding base 130 to adjust the relative distance between the first imaging device 110 and the second imaging device 120. For example, as shown in the left portion of FIG. 2, the relative distance between the first imaging device 110 and the second imaging device 120 is indicated by "d1". As shown in the right portion of FIG. 2, the relative distance between the first imaging device 110 and the second imaging device 120 is indicated by "d2". Be noted that, in this case, the relative distance "d2" is greater than the relative distance "d1". The angle of intersection between back projected rays for the depth is indicated by "θ1" when the relative distance between the first imaging device 110 and the second imaging device 120 is "d1", and the angle of intersection between back projected rays for the depth is indicated by "θ2" when the relative distance between the first imaging device 110 and the second imaging device 120 is "d2. Be noted that, the angle "θ2" is greater than the angle "θ1", such that the smaller angle "θ1" results in an inaccurate depth while the larger angle "θ2" results in a more reliable depth.

Initially, the first imaging device 110 and the second imaging device 120 will be zoomed out to view the whole scene. The user can view the scene, wherein the first imaging device 110 and the second imaging device 120 are sufficiently far apart so that a reliable depth is obtained.

The user may choose to zoom into to a specific area or a particular human face by selecting a point or a region on the image. The detecting module 140 detects the specific area or the particular human face of the image in real time, and the current estimated depth information at the point or the region is sampled by the estimating module 150. Alternatively, if an object is moving towards the camera, or the initial baseline was not optimal, the central area of the scene is sampled and the average/median approximate depth is calculated by the calculating module 160.

Given the approximate depth value obtained previously, the calculating module 160 may use a simple calculation to determine the correct baseline that would give the desired angle of intersection between back-projected rays for that depth. In one embodiment of the present invention, the calculating module 160 may calculate the desired baseline based on a fixed linear scaling of the depth value of the baseline. For example, optimal baseline (mm)=0.1×depth value (mm).

Hence, the desired baseline is calculated by the calculating module 160, and then the sliding base 130 is controlled by the control module 170 to be electronically adjusted slowly towards the desired value. Once the desired baseline is reached, the motion of the first imaging device 110 and/or the second imaging device 120 is stopped, and new more reliable depth information can be estimated. In another embodiment of the present invention, a first focal length of the first imaging device 110 may be automatically adjusted, such that the target region is filled with a first zoomed image; and a second focal length of the second imaging device 120 may be automatically adjusted, such that the target region is filled with a second zoomed image. That is to say, if the user chose to adjust the optical zoom of the first imaging device 110 and the second imaging device 120, then this can occur at the same time (manually or under electronic control).

In this manner, as the user focuses interest on specific areas, or as an object moves towards the first imaging device 110 and the second imaging device 120, the baseline of the depth imaging system 100 may be adjusted by the control module 170 to ensure that optimal reliable depth information can be achieved.

At any time, the user can capture a "screen grab" of the area of interest, including 3D data which can then be used for security purposes, such as automatic object identification, or 3D face recognition. Alternatively, the 3D data can be used to allow a slight change in viewpoint, so the user is able to perceive depth—e.g. by manually controlling viewpoint adjustment or by presenting different views to each eye for stereo display and human depth perception.

The identification of interest areas may also occur automatically without human control. For example, using a 2D image face tracker, it is possible to automatically find a face of interest in the video feed and adjust the stereo baseline to ensure that 3D depth data is accurately extracted for that person's face.

It should be noted that, the above-mentioned depth imaging system 100 is merely used to help understand the core idea of the present invention, and should not be limitations of the present invention.

According to another embodiment of the present invention, a method for controlling a depth imaging system of any one of the foregoing embodiments is provided.

Figure 3:
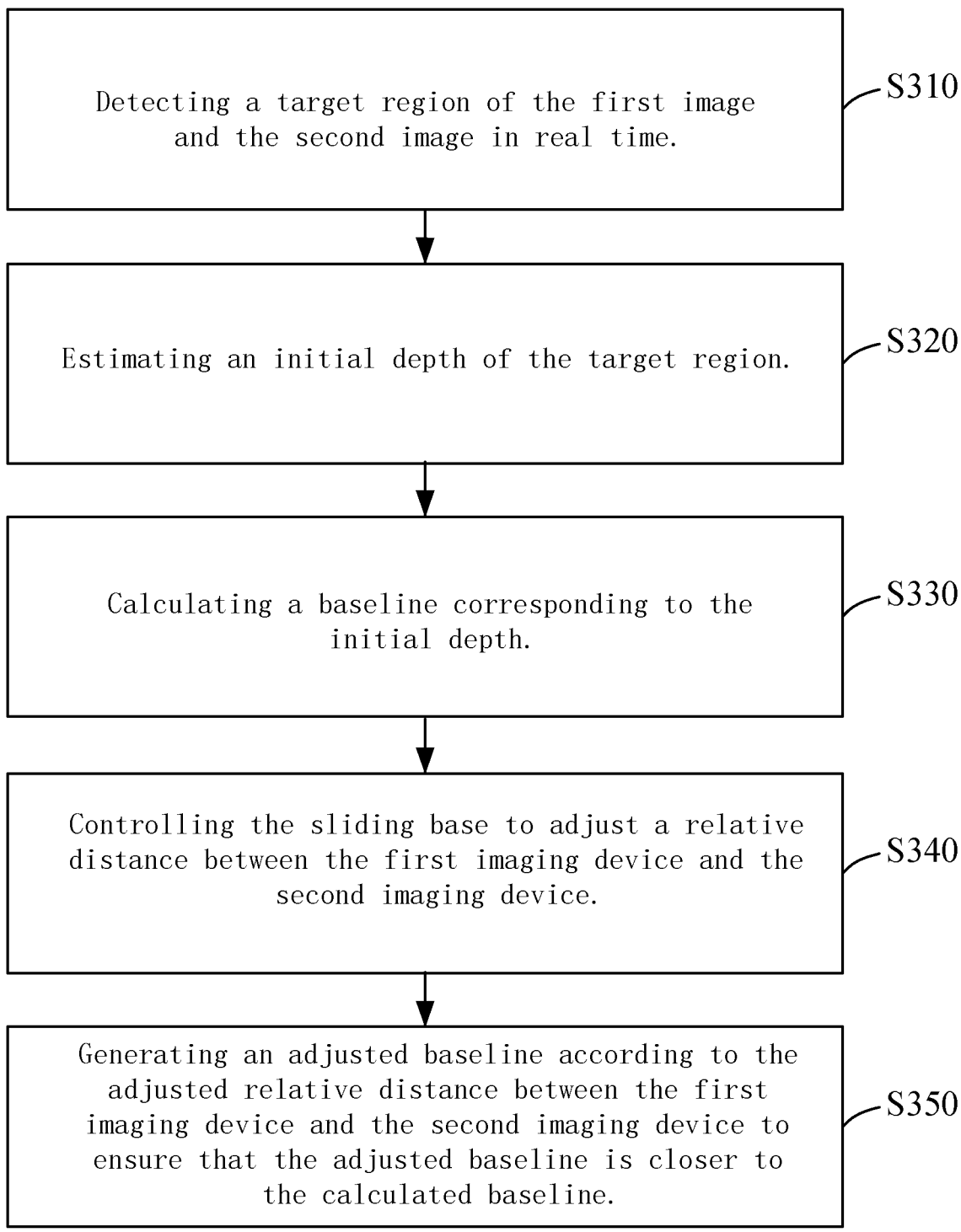
FIG. 3 is a flow chart showing a method for controlling a depth imaging system according to an embodiment of the present invention.

Please refer to FIG. 3. FIG. 3 is a flow chart showing a method for controlling a depth imaging system according to an embodiment of the present invention. The depth imaging system includes a first imaging device for capturing a first image and a second imaging device for capturing a second image mounted on a sliding base. The method includes the following steps.

Step S310: Detecting a target region of the first image and the second image in real time.

Step S320: Estimating an initial depth of the target region.

Step S330: Calculating a baseline corresponding to the initial depth.

Step S340: Controlling the sliding base to adjust a relative distance between the first imaging device and the second imaging device.

Step S350: Generating an adjusted baseline according to the adjusted relative distance between the first imaging device and the second imaging device to ensure that the adjusted baseline is closer to the calculated baseline.

Be noted that, in one implementation manner, the method for controlling a depth imaging system may further include the following steps.

Step S360A: Automatically adjusting a first focal length of the first imaging device, such that the target region is filled with a first zoomed image.

Step S360B: Automatically adjusting a second focal length of the second imaging device, such that the target region is filled with a second zoomed image.

Be noted that, in one implementation manner, the method for controlling a depth imaging system may further include the following steps.

Step S370: Sampling a central region of a scene, and calculating an approximate depth of an average value or an intermediate value of the central region.

Be noted that, in one implementation manner, the step S330 may further include the following sub-steps.

Sub-step S331: Calculating the baseline based on a fixed linear scaling of a depth value of the baseline.

For example, the baseline may be calculated based on the equation: baseline=0.1×depth value.

With the above technical solution, the beneficial effects of the depth imaging system of the present invention are as follows: an optimal baseline can be adjusted to obtain accurate depth information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A depth imaging system, comprising:
   a first imaging device, configured to capture a first image;
   a second imaging device, configured to capture a second image;
   a sliding base, wherein the first imaging device and the second imaging device are mounted on the sliding base;
   a detecting module, configured to detect a target region of the first image and the second image in real time;
   an estimating module, coupled to the detecting module, and configured to estimate an initial depth of the target region;
   a calculating module, coupled to the estimating module, and configured to calculate a baseline corresponding to the initial depth;
   a control module, coupled to the calculating module and the sliding base, and configured to control the sliding base to adjust a relative distance between the first imaging device and the second imaging device;
   wherein the calculating module is further configured to generate an adjusted baseline according to the adjusted relative distance between the first imaging device and the second imaging device, such that the adjusted baseline is closer to the calculated baseline.

2. The depth imaging system in claim 1, wherein a first focal length of the first imaging device is automatically adjusted, such that the target region is filled with a first zoomed image; and a second focal length of the second imaging device is automatically adjusted, such that the target region is filled with a second zoomed image.

3. The depth imaging system in claim 1, wherein the first imaging device and the second imaging device are two cameras.

4. The depth imaging system in claim 1, wherein the first imaging device is a projector and the second imaging device is an imaging camera.

5. The depth imaging system in claim 1, wherein the estimating module is further configured to sample a central region of a scene, and calculate an approximate depth of an average value or an intermediate value of the central region.

6. The depth imaging system in claim 1, wherein the calculating module is further configured to calculate the baseline based on a fixed linear scaling of a depth value of the baseline.

7. The depth imaging system in claim 6, wherein the baseline is calculated based on the equation: baseline=0.1× depth value.

8. A method for controlling a depth imaging system, the depth imaging system comprising a first imaging device for capturing a first image and a second imaging device for capturing a second image mounted on a sliding base, the method comprising the following steps:
   detecting a target region of the first image and the second image in real time;
   estimating an initial depth of the target region;
   calculating a baseline corresponding to the initial depth;
   controlling the sliding base to adjust a relative distance between the first imaging device and the second imaging device; and
   generating an adjusted baseline according to the adjusted relative distance between the first imaging device and the second imaging device, such that the adjusted baseline is closer to the calculated baseline.

9. The method for controlling a depth imaging system in claim 8, further comprising:
   automatically adjusting a first focal length of the first imaging device, such that the target region is filled with a first zoomed image; and
   automatically adjusting a second focal length of the second imaging device, such that the target region is filled with a second zoomed image.

10. The method for controlling a depth imaging system in claim 8, wherein the first imaging device and the second imaging device are two cameras.

11. The method for controlling a depth imaging system in claim 8, wherein the first imaging device is a projector and the second imaging device is an imaging camera.

12. The method for controlling a depth imaging system in claim 8, further comprising:
   sampling a central region of a scene, and calculating an approximate depth of an average value or an intermediate value of the central region.

13. The method for controlling a depth imaging system in claim 8, wherein the step of calculating the baseline corresponding to the initial depth comprises:
   calculating the baseline based on a fixed linear scaling of a depth value of the baseline.

14. The method for controlling a depth imaging system in claim 13, wherein the baseline is calculated based on the equation: baseline=0.1×depth value.

\* \* \* \* \*